United States Patent
Zeng et al.

(10) Patent No.: US 12,149,042 B2
(45) Date of Patent: Nov. 19, 2024

(54) METHOD AND SYSTEM FOR AUTOMATICALLY CONTROLLING MODE-LOCKING OF A OPTICAL FREQUENCY COMB

(71) Applicants: CHONGQING INSTITUTE OF EAST CHINA NORMAL UNIVERSITY, Chongqing (CN); SHANGHAI LANGYAN OPTOELECTRONICS TECHNOLOGY CO., LTD., Shanghai (CN); EAST CHINA NORMAL UNIVERSITY, Shanghai (CN)

(72) Inventors: Heping Zeng, Chongqing (CN); Shuang Li, Chongqing (CN); Xuling Shen, Shanghai (CN)

(73) Assignees: CHONGQING INSTITUTE OF EAST CHINA NORMAL UNIVERSITY, Chongqing (CN); SHANGHAI LANGYAN OPTOELECTRONICS TECHNOLOGY CO., LTD., Shanghai (CN); EAST CHINA NORMAL UNIVERSITY, Shanghai (CN)

( * ) Notice: Subject to any disclaimer, the term of this patent is extended or adjusted under 35 U.S.C. 154(b) by 774 days.

(21) Appl. No.: 17/169,491

(22) Filed: Feb. 7, 2021

(65) Prior Publication Data

US 2021/0265803 A1 Aug. 26, 2021

(30) Foreign Application Priority Data

Feb. 24, 2020 (CN) .......................... 202010113454.5

(51) Int. Cl.
*H01S 3/13* (2006.01)
*H01S 3/1106* (2023.01)
(Continued)

(52) U.S. Cl.
CPC .......... *H01S 3/1109* (2013.01); *H01S 3/1106* (2013.01); *H01S 3/1305* (2013.01);
(Continued)

(58) Field of Classification Search
None
See application file for complete search history.

(56) References Cited

U.S. PATENT DOCUMENTS

| 7,668,213 B2 * | 2/2010 | Hoffman | H01S 3/1022 372/18 |
| 7,701,982 B2 * | 4/2010 | Yu | H01S 3/1109 372/18 |

(Continued)

FOREIGN PATENT DOCUMENTS

| CN | 102368590 A | 3/2012 |
| CN | 103001114 A | 3/2013 |

(Continued)

OTHER PUBLICATIONS

Yang Li, Shen Xuling, Yang Kangwen, Hao Qiang, Zeng Heping; Analysis and Realization of Adaptive Dual-Comb Spectroscopy; May 31, 2018.

*Primary Examiner* — Tod T Van Roy (57) ABSTRACT

A method and a system for automatically controlling mode-locking of an optical frequency comb, where the stored control parameters of the working condition in the mode-locked state is combined with the collected working feedback parameters of the optical frequency comb system to dynamically adjust and control the working power of the pump source or/and the temperature of the working environment of the pump source, which not only greatly shortens the control time for stable mode-locking and realizes a fast mode-locking control, but also reduces unnecessary power consumption, thereby further guaranteeing the energy-saving effect of power adjustment control process. The present (Continued)

disclosure well maintains the stable working conditions of the optical comb system, and realizes the mode-locking optimization control of an update mode for the big data, thereby effectively improving the mode-locking control process of the optical frequency comb system, and providing higher operation stability and measurement accuracy.

5 Claims, 2 Drawing Sheets (51) Int. Cl.
 *H01S 3/1109* (2023.01)
 *H01S 3/131* (2006.01)
 *H01S 3/10* (2006.01)

(52) U.S. Cl.
 CPC ........ *H01S 3/1312* (2013.01); *H01S 3/10069* (2013.01); *H01S 3/1307* (2013.01)

(56) References Cited

U.S. PATENT DOCUMENTS

| | | | | |
|---|---|---|---|---|
| 8,218,587 | B2 * | 7/2012 | Stoev | H01S 3/106 372/100 |
| 9,647,408 | B2 * | 5/2017 | Lowell | H01S 3/0078 |
| 9,806,488 | B2 * | 10/2017 | Lowder | H01S 3/094076 |
| 11,294,256 | B2 * | 4/2022 | Zeng | H01S 3/1305 |
| 11,367,990 | B2 * | 6/2022 | Eichenholz | H01S 3/0912 |
| 11,664,635 | B2 * | 5/2023 | Zeng | H01S 3/0014 372/25 |
| 2002/0176452 | A1 * | 11/2002 | Lin | H01S 3/1109 372/18 |
| 2006/0146892 | A1 * | 7/2006 | Hoffman | H01S 3/10015 372/6 |
| 2008/0074660 | A1 * | 3/2008 | Ye | G01N 21/359 356/454 |
| 2016/0094010 | A1 | 3/2016 | Hartl et al. | |
| 2018/0083414 | A1 | 3/2018 | Weiner et al. | |
| 2018/0351321 | A1 * | 12/2018 | Pino | H01S 3/1118 |
| 2021/0159661 | A1 * | 5/2021 | Puppe | H01S 3/1106 |
| 2021/0175678 | A1 * | 6/2021 | Zeng | H01S 3/1307 |
| 2021/0265803 | A1 * | 8/2021 | Zeng | H01S 3/1109 |
| 2021/0265804 | A1 * | 8/2021 | Zeng | G02F 1/353 |
| 2023/0114758 | A1 * | 4/2023 | Zeng | H01S 3/06791 372/18 |

FOREIGN PATENT DOCUMENTS

| | | | | |
|---|---|---|---|---|
| CN | 103563189 A | | 2/2014 | |
| CN | 103904546 A | | 7/2014 | |
| CN | 105428987 A | | 3/2016 | |
| CN | 106025779 A | | 10/2016 | |
| CN | 108963737 A | | 12/2018 | |
| CN | 109066278 A | * | 12/2018 | ............ H01S 3/067 |
| CN | 110739601 A | | 1/2020 | |
| CN | 111162438 A | * | 5/2020 | ............ G02F 1/353 |

\* cited by examiner

METHOD AND SYSTEM FOR AUTOMATICALLY CONTROLLING MODE-LOCKING OF A OPTICAL FREQUENCY COMB

CROSS-REFERENCE TO RELATED APPLICATIONS

This application claims the benefit of priority from Chinese Patent Application No. 202010113454.5, filed on Feb. 24, 2020. The content of the aforementioned application, including any intervening amendments thereto, is incorporated herein by reference in its entirety.

TECHNICAL FIELD

The present application relates to laser control technologies, and more particularly to a method and a system for automatically controlling mode-locking of an optical frequency comb.

BACKGROUND

An optical frequency comb (OFC) refers to a spectrum consisting of a series of equally spaced frequency components with a coherently stable phase relationship. With the rapid development of optical communication technology, optical frequency combs have attracted the attention of more and more scholars due to their wide application in optical arbitrary waveform generation, multi-wavelength ultrashort pulse generation, and dense wavelength division multiplexing.

Optical frequency combs have become a major breakthrough in laser technology following the advent of ultrashort pulse lasers. In this field, scientists J. Hall and T. W. Hansch, who carried out pioneering work, won the Nobel Prize in 2005. In principle, the optical frequency comb appears as an optical frequency sequence with equal frequency intervals in the frequency domain, and as an electromagnetic field oscillation envelope with a femtosecond time width in the time domain, where the spectral width of the optical frequency sequence and the time width of the slowly varying envelope of the electromagnetic field oscillation satisfy the Fourier transform relationship. The distribution characteristics of the ultrashort pulses in the time domain and frequency domain is similar to a comb used in our daily life, so it is visually called a frequency comb of the optical band, or "optical comb" for short. As an optical frequency integrated generator, the optical comb is by far the most effective tool for absolute optical frequency measurement. The optical comb can accurately and simply link the cesium atom microwave frequency standard with the optical frequency standard, which can not only provides a carrier for the development of high-resolution, high-precision, and high-accuracy frequency standards, but also provides an ideal research tool for scientific research directions such as precision spectra, astrophysics, and quantum manipulation, thereby gradually being used in the fields of precision measurement of optical frequency, measurement of atomic and ion transition energy level, remote signal clock synchronization and satellite navigation.

Although optical frequency combs are widely used in the field of optical frequency measurement, a debugging of mode-locking signals of the optical comb is a complicated process, in which the repetition frequency, the line width of the optical carrier envelope, and the stability of the mode-locking signal are affected by the influences of the pump power and the environment temperature, for example, the fluctuation of pump power or environment temperature makes the repetition frequency of the optical comb and the phase of the carrier envelope unstable, causing a loss of the mode-locking of the optical comb. In addition, the working temperature change caused by the heating of the pump source itself affect a change of working temperature, and further influences the mode-locking stability of repetition frequency and carrier envelope phase, resulting in a decrease in the measurement accuracy of the optical comb system.

Therefore, it has become an urgent problem to improve the mode-locking control process of the optical frequency comb system to ensure its operational stability and measurement accuracy.

SUMMARY

In order to solve the above-mentioned technical defects, the present disclosure provides a method for automatically controlling mode-locking of an optical frequency comb to improve mode-locking control process of an optical frequency comb system, to provide stability and measurement accuracy for the optical comb system.

To achieve the above object, the present disclosure provides a method for automatically controlling mode-locking of an optical frequency comb, comprising:

collecting working feedback parameters of an optical frequency comb system; wherein the working feedback parameters comprises mode-locking frequency parameters, a power parameter of a pump source, a temperature parameter of the pump source, and a working environment temperature parameter of the pump source; the mode-locking frequency parameters comprises a repetition frequency parameter of an optical comb carrier and an envelope phase parameter of the optical comb carrier; and retrieving a stored control parameter of a working condition in the mode-locked state, combining with the working feedback parameters, dynamically adjusting a working power of the pump source or/and a temperature of the working environment of the pump source in the optical frequency comb system, thereby completing mode-locking of the optical frequency comb; and according to a control parameter of an actual working condition after the mode-locking, updating the stored control parameter of the working condition in the mode-locked state for subsequent retrieval.

In an embodiment, the stored control parameter of the working condition in the mode-locked state comprises a power-temperature curve under mode-locked state in a starting working condition and setting information of a working power of the pump source corresponding to the mode-locked state in a stable working condition; the power-temperature curve under the mode-locked state in the starting working condition shows a relationship between a temperature of the pump source in the starting working condition and a working power of the pump source required for mode-locking;

a process of dynamically adjusting the working power of the pump source comprises:

upon starting, searching a working power value of the pump source required for mode-locking corresponding to a current temperature of the pump source from the power-temperature curve under the mode-locked state in the starting working condition according to a current temperature parameter of the pump source; adjusting and setting the working power of the pump source according to the working power value;

determining the mode-locked state of an optical comb according to a current mode-locking frequency parameter; if the optical comb is mode-locked, maintaining the working power value of the pump source; if the optical comb is not in the mode-locked state, further adjusting the working power of the pump source until the optical comb is in the mode-locked state, and maintaining the working power value of the pump source, so that the optical frequency comb is maintained in the mode-locked state;

when mode-locking time of the optical comb after starting reaches a preset starting stabilization duration, adjusting and setting the working power of the pump source according to the setting information of the working power of the pump source corresponding to the mode-locked state in the stable working condition, so that the optical frequency comb is maintained in the mode-locked state.

In an embodiment, a process of updating the stored control parameter of the working condition in the mode-locked state comprises:

after further adjusting the working power of the pump source until the optical comb is in the mode-locked state, feeding back the working power value of the pump source in the mode-locked state and the current temperature of the pump source; and updating a working power value of the pump source located at a point of the current temperature of the pump source in power-temperature curve under the mode-locked state in the starting working condition according to the working power value of the pump source.

In an embodiment, the setting information of the working power of the pump source corresponding to the mode-locked state in the stable working condition comprises a power-temperature curve under the mode-locked state in the stable working condition, showing a relationship between the temperature of the pump source and the working power of the pump source required for mode-locking in the stable working condition;

a process of adjusting and setting the working power of the pump source according to the setting information of the working power of the pump source in the stable working condition comprises:

searching a working power value of the pump source required for mode-locking corresponding to a current temperature of the working environment of the pump source in real time from the power-temperature curve under the mode-locked state in the stable working condition according to the current temperature parameter of the pump source; adjusting and setting the pump source according to the working power value;

determining the mode-locked state of the optical comb by detecting a current mode-locking frequency parameter in real time; if the optical comb is mode-locked, maintaining the working power value of the pump source; if the optical comb is out of the mode-locked state, adjusting the working power of the pump source until the optical comb is mode-locked, and maintaining the working power value of the pump source, so that the optical frequency comb is maintained in the mode-locked state.

In an embodiment, a process of updating the stored control parameter of the working condition in the mode-locked state comprises:

after adjusting the working power of the pump source until the optical comb is in the mode-locked state, feeding back the working power value of the pump source in the mode-locked state and the current temperature of the pump source; and updating a working power value of the pump source located at a point of the current temperature of the pump source in power-temperature curve under the mode-locked state in the starting working condition according to the working power value of the pump source.

In an embodiment, the control parameter of the working condition comprises mode-locking reference environment temperature parameter and a reference pump source temperature parameter in a stable working condition;

a process of dynamically adjusting the temperature of the working environment of the pump source comprises:

upon starting, adjusting the temperature of the working environment of the pump source according to the mode-locking reference environment temperature parameter; after the temperature of the working environment of the pump source reaches a value of the mode-locking reference environment temperature, continuously controlling the temperature of the working environment of the pump source according to the mode-locking reference environment temperature parameter, and determining in real time whether a difference between a collected temperature of the pump source and the reference pump source temperature parameter in the stable working condition exceeds a preset warning range of a self-adjusting temperature of the pump source; and adjusting the temperature of the working environment of the pump source when the difference exceeds the preset warning range, so that the difference is restored to the preset warning range.

The present disclosure further provides a system for automatically controlling mode-locking of an optical frequency comb, comprising:

an upper computer control device; and
mode-locking control subsystem for data communication with the upper computer control device;
wherein the mode-locking control subsystem comprises:
a pump source, arranged in a temperature-controlled environment for generating pump light;
a voltage-controlled constant current source, for driving the pump source; adjusting and controlling a working power of the pump source; and feeding back power parameters of the pump source when the pump source is working;
a pump source temperature sensing device, for collecting a temperature parameter of the pump source when the pump source is working;
an optical comb carrier acquisition device, for acquiring an optical comb carrier signal carrying mode-locking frequency parameters; the mode-locking frequency parameters comprises a repetition frequency parameter of an optical comb carrier and an envelope phase parameter of the optical comb carrier
an environment temperature control device, for adjusting and controlling a temperature of the working environment of the pump source;
an environment temperature sensing device, for sensing a working environment temperature parameter of the pump source; and
a central control device, for storing a set mode-locked state parameter and a control parameter of a working condition in the mode-locked state; extracting the mode-locking frequency parameters from the optical comb carrier signal; retrieving a stored control parameter of the working condition in the mode-locked state, and combining with a collected mode-locking frequency parameter, a collected power parameter of the pump source, a collected working environment temperature parameter of the pump source, to dynamically adjust the working power of the pump source or/and the temperature of the working environment of the pump source in an optical frequency comb system, thereby achieving mode-locking control of the optical frequency comb; and feeding back a control parameter of an actual working condition after mode-locking to the upper computer control device;

the upper computer control device is provided for setting the mode-locked state parameter and transferring the mode-locked state parameter to the mode-locking control subsystem for storage; and according to the control parameter of the actual working condition after the mode-locking, updating the control parameter of the working condition in the mode-locked state stored in the mode-locking control subsystem for subsequent retrieval.

In an embodiment, the optical comb carrier acquisition device comprises an optical comb carrier acquisition module and a photoelectric conversion module; the optical comb carrier acquisition module is provided for an optical comb carrier; and the photoelectric conversion module is provided for performing a photoelectric conversion on the optical comb carrier to obtain the optical comb carrier signal carrying the mode-locking frequency parameters.

In an embodiment, the central control device comprises a parameter setting and storage module, a data acquisition and processing module, a data buffer and control module, and a lower computer control module;

the parameter setting and storage module is provided for storing a set mode-locked state parameter and a set control parameter for the working condition in mode-locked state;

the data acquisition and processing module is provided for extracting the mode-locking frequency parameters from the optical comb carrier signal obtained by the optical comb carrier acquisition device, and receiving and collecting the power parameter of the power source from the voltage-controlled constant current source, the temperature parameter of the pump source from the pump source temperature sensing device and the working environment temperature parameter of the pump source from the environment temperature sensing device;

the data buffer and control module is provided for buffering the mode-locking frequency parameters, the power parameter of the pump source, the temperature parameter of the pump source and the working environment temperature parameter of the pump source and transmitting them to the lower computer control module;

the lower computer control module is provided for retrieving the stored control parameter of the working condition in the mode-locked state, and combining with the mode-locking frequency parameters, the power parameter of the pump source, the working environment temperature parameter of the pump source, to respectively send a control command to the voltage-controlled constant current source and the environment temperature control device, to dynamically adjust the working power of the pump source or/and the temperature of the working environment of the pump source in the optical frequency comb system, thereby achieving the mode-locking control of the optical frequency comb; and feeding back the control parameter of the actual working condition after the mode-locking to the upper computer control device; and the upper computer control device is provided for setting the mode-locked state parameter and transferring the mode-locked state parameter to the parameter setting and storage module for storage; and according to the control parameter of the actual working condition after the mode-locking, updating the control parameter of the working condition in the mode-locked state stored in the parameter setting and storage module for subsequent retrieval.

In an embodiment, a DA group is provided between the data acquisition and processing module and feedback signal terminals of the voltage-controlled constant current source, the pump source temperature sensing device, the optical comb carrier acquisition device and the environment temperature sensing device for respectively performing a digital-to-analog conversion communication, so that a digital signal is converted to an analog signal through the AD group and then transmitted to the data acquisition and processing module;

an AD group is provided between the lower computer control module and the voltage-controlled constant current source, and the environment temperature sensing device for performing an analog-to-digital conversion communication, thereby converting an analog signal to a digital signal to control the voltage-controlled constant current and the environment temperature sensing device.

Compared to the prior art, the present invention has following beneficial effects.

1. In the method and system for automatically controlling the mode-locking of the optical frequency comb of the present invention, the working power of the pump source can be dynamic adjusted and controlled by using the stored mode-locked state control parameter and the collected working feedback parameters of the optical frequency comb system, which not only greatly shortens a control time of a stable mode-locked state, to realize a fast mode-locking control, but also quickly stabilizes the stable power control of the working condition, to reduce unnecessary power consumption caused by an unnecessary power reciprocating oscillation tracking control, thereby achieving an energy-saving effect in the power adjustment control process.

2. In the method and system for automatically controlling the mode-locking of the optical frequency comb of the present invention, the control parameter of the working condition in the mode-locked state can be updated subsequently during the mode-locking control and the working process of the optical frequency comb, so that the control parameter of the working condition in the mode-locked state are more aligned with the actual working condition of the optical comb system. Therefore, in the subsequent mode-locking control, when the control parameter of the working condition in the mode-locked state are retrieved for the mode-locking adjustment control, a fast mode-locking and a stable working of the optical comb system are more easily to be implemented.

3. In the method and system for automatically controlling the mode-locking of the optical frequency comb of the present invention, the temperature of the working environment of the pump source is dynamically adjusted and controlled, so that the environment temperature can quickly reach the reference environment temperature required for mode-locking, which not only creates a good temperature condition for the mode-locked state of the optical comb system, but also improves the environment temperature stability control efficiency in the stable working condition, which is beneficial to the optical comb system to maintain stable working condition.

4. In the method and system for automatically controlling the mode-locking of the optical frequency comb of the present invention, a fast mode-locking control can be effectively realized through a dynamic adjustment control and coordination of the working power of the pump source and the temperature of the working environment of the pump source, thereby achieving the energy-saving effect in the power adjustment control process.

5. In the method and system for automatically controlling the mode-locking of the optical frequency comb of the present invention, an upper computer control device is provided for communicating with multiple mode-locking control subsystems to realize mode-locking optimization control of big data update, which is more conducive to the fast mode-locking and maintenance of the mode-locked state of the optical comb system, thereby improving the mode-locking control process, and ensuring the working stability and measurement accuracy of the optical frequency comb system.

DETAILED DESCRIPTION OF EMBODIMENTS

Figure 1:
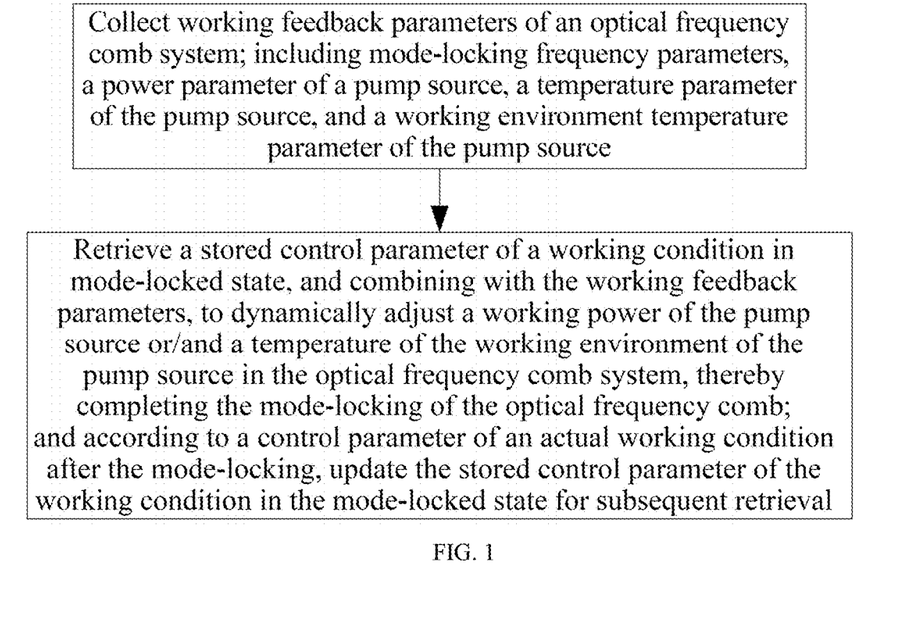
FIG. 1 is a flowchart of a method for automatically controlling mode-locking of an optical frequency comb according to an embodiment of the present disclosure.

As shown in FIG. 1, aiming at a practical application of optical frequency combs, the present disclosure provides a method for controlling mode-locking of an optical frequency comb, includes the following steps. Working feedback parameters of an optical frequency comb system are collected, where the working feedback parameters includes mode-locking frequency parameters, a power parameter of a pump source, a temperature parameter of the pump source, and a working environment temperature parameter of the pump source. the mode-locking frequency parameters includes a repetition frequency parameter of an optical comb carrier and an envelope phase parameter of the optical comb carrier. Through retrieving a stored control parameter of a working condition in the mode-locked state and combining with the working feedback parameters, a working power of the pump source or/and a temperature of the working environment of the pump source in the optical frequency comb system are dynamically adjusted, thereby completing mode-locking of the optical frequency comb. And according to a control parameter of an actual working condition after the mode-locking, the stored control parameter of the working condition in the mode-locked state is updated for subsequent retrieval.

Specifically, the technical solution of the present disclosure is as follows. Through the stored control parameter of the working condition in the mode-locked state and the collected working feedback parameters of the optical frequency comb system, the working working condition and working feedback of the collected optical frequency comb can be obtained. Therefore, the working power of the pump source or/and the temperature of the working environment of the pump source in the optical frequency comb system are dynamically adjusted to completed an automatic mode-locking of the optical frequency comb. In addition, the stored control parameter of the working condition in the mode-locked state is further updated according to the control parameter of an actual working condition in the mode-locked state after the mode-locking for subsequent recall, so as to achieve the purpose of adaptive mode-locking optimization control, thereby improving mode-locking control process, and ensuring the working stability and measurement accuracy of the optical frequency comb system.

In terms of specific design and implementation, based on the idea of the method for automatically controlling the mode-locking of the optical frequency comb provided by the present disclosure, to implement the above-mentioned control method, the present disclosure further provides a system for automatically controlling the mode-locking of the optical frequency comb, including an upper computer control device, and mode-locking control subsystem for data communication with the upper computer control device.

Specifically, the mode-locking control subsystem includes:
  a pump source, arranged in a temperature-controlled environment for generating pump light;
  a voltage-controlled constant current source, for driving the pump source; adjusting and controlling a working power of the pump source; and feeding back power parameters of the pump source when the pump source is working;
  a pump source temperature sensing device, for collecting a temperature parameter of the pump source when the pump source is working;
  an optical comb carrier acquisition device, for acquiring an optical comb carrier signal carrying mode-locking frequency parameters; the mode-locking frequency parameters comprises a repetition frequency parameter of an optical comb carrier and an envelope phase parameter of the optical comb carrier
  an environment temperature control device, for adjusting and controlling a temperature of the working environment of the pump source;
  an environment temperature sensing device, for sensing a working environment temperature parameter of the pump source; and
  a central control device, for storing a set mode-locked state parameter and a control parameter of a working condition in the mode-locked state; extracting the mode-locking frequency parameters from the optical comb carrier signal; retrieving a stored control parameter of the working condition in the mode-locked state, and combining with a collected mode-locking frequency parameter, a collected power parameter of the pump source, a collected working environment temperature parameter of the pump source, to dynamically adjust the working power of the pump source or/and the temperature of the working environment of the pump source in an optical frequency comb system, thereby achieving mode-locking control of the optical frequency comb; and feeding back a control parameter of an actual working condition after mode-locking to the upper computer control device.

The upper computer control device is provided for setting the mode-locked state parameter and transferring the mode-locked state parameter to the mode-locking control subsystem for storage; and according to the control parameter of the actual working condition after the mode-locking, updating the control parameter of the working condition in the mode-locked state stored in the mode-locking control subsystem for subsequent retrieval.

In an actual application, the voltage-controlled constant current source in the mode-locking control subsystem can be realized by the power supply equipment of the pump source with a constant current and a controllable voltage. The environment temperature control device can be realized by a temperature control device or a temperature control circuit with a two-way temperature control function of cooling and heating. The pump source temperature sensing device and the environment temperature sensing device can be realized by common temperature measuring devices such as thermistor temperature sensing devices. The above-mentioned devices are existing devices with mature technology that can be purchased commercially.

The optical comb carrier acquisition device can be designed to include an optical comb carrier acquisition module and a photoelectric conversion module. The optical comb carrier acquisition module is provided for an optical comb carrier. And the photoelectric conversion module is provided for performing a photoelectric conversion on the optical comb carrier to obtain the optical comb carrier signal carrying the mode-locking frequency parameters. The optical comb carrier acquisition device adopted in the present disclosure is also the mode-locking parameter monitoring module circuit commonly used in the optical frequency comb system.

In the specific design and implementation, the central control device is designed to include a parameter setting and storage module, a data acquisition and processing module, a data buffer and control module, and a lower computer control module.

The parameter setting and storage module is provided for storing a set mode-locked state parameter and a set control parameter for the working condition in mode-locked state.

The data acquisition and processing module is provided for extracting the mode-locking frequency parameters from the optical comb carrier signal obtained by the optical comb carrier acquisition device, and receiving and collecting the power parameter of the power source from the voltage-controlled constant current source, the temperature parameter of the pump source from the pump source temperature sensing device and the working environment temperature parameter of the pump source from the environment temperature sensing device.

The data buffer and control module is provided for buffering the mode-locking frequency parameters, the power parameter of the pump source, the temperature parameter of the pump source and the working environment temperature parameter of the pump source and transmitting them to the lower computer control module.

The lower computer control module is provided for retrieving the stored control parameter of the working condition in the mode-locked state, and combining with the mode-locking frequency parameters, the power parameter of the pump source, the working environment temperature parameter of the pump source, to respectively send a control command to the voltage-controlled constant current source and the environment temperature control device, to dynamically adjust the working power of the pump source or/and the temperature of the working environment of the pump source in the optical frequency comb system, thereby achieving the mode-locking control of the optical frequency comb; and feeding back the control parameter of the actual working condition after the mode-locking to the upper computer control device.

Since the voltage-controlled constant current source, the environment temperature control device, the pump source temperature sensing device, the optical comb carrier acquisition device and the environment temperature sensing device are usually electronic devices controlled by analog signals in the actual technical implementation. The central control device needs to perform operations after parameter collection, such as summary, comparison, judgment, and command control, so it is usually necessary to adopt a numerical control electronic device adopting digital chip combined with digital circuit in technical realization. Therefore, in the design and implementation of the hardware architecture of the system for automatically controlling the mode-locking of the optical frequency comb, a DA group is provided between the data acquisition and processing module and feedback signal terminals of the voltage-controlled constant current source, the pump source temperature sensing device, the optical comb carrier acquisition device and the environment temperature sensing device for respectively performing a digital-to-analog conversion communication, so that a digital signal is converted to an analog signal through the AD group and then transmitted to the data acquisition and processing module. An AD group is provided between the lower computer control module and the voltage-controlled constant current source, and the environment temperature sensing device for performing an analog-to-digital conversion communication, thereby converting an analog signal to a digital signal to control the voltage-controlled constant current and the environment temperature sensing device. The DA group can be composed of a plurality of digital-to-analog converters, and the AD group can be composed of a plurality of analog-to-digital converters. Both the DA group and the AD group are controlled by the lower computer control module to uniformly control their respective conversion functions.

Figure 2:
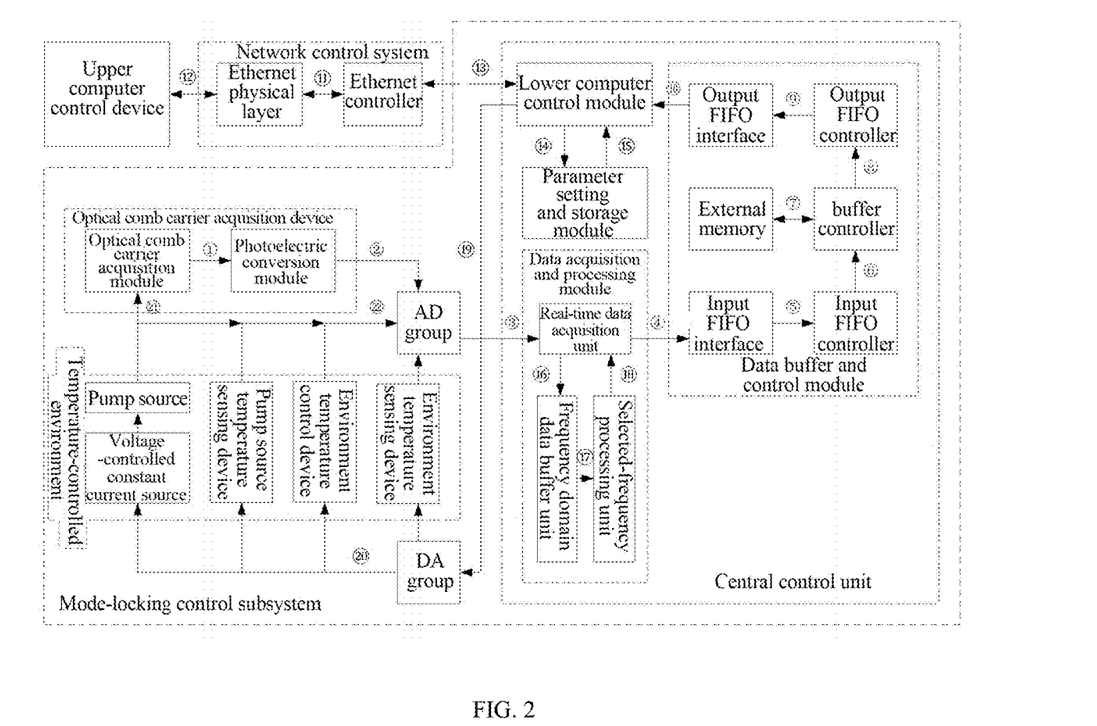
FIG. 2 is a schematic diagram of a structure of a system for automatically controlling the mode-locking of the optical frequency comb according to an embodiment of the present disclosure.

In a design and implementation of the hardware architecture of the system for automatically controlling the mode-locking of the optical frequency comb, an implementation scheme with a hardware system architecture as shown in FIG. 2 can be adopted.

A data sampling frequency of the analog-to-digital conversion of the AD group for the feedback signals from the voltage-controlled constant current source, the pump source temperature sensing device, the optical comb carrier acquisition device and the environment temperature sensing device is preferably above 500 M, and a sampling accuracy is preferably above 12 bit, where a data transmission signal flow is as a flow ②①②③ shown in FIG. 2.

The data acquisition and processing module can be designed to include a real-time data acquisition unit, a frequency domain data buffer unit and a selected-frequency processing unit. The real-time data acquisition unit is provided for receiving the optical comb carrier signal from the optical comb carrier acquisition device, the power parameter of the pump source from the voltage-controlled constant current source, the temperature parameter of the power source from the pump source temperature sensing device, and the working environment temperature parameter of the pump source from the environment temperature sensing device. The real-time data acquisition unit is further provided for performing a Fast Fourier Transform for the optical comb carrier signal to obtain the frequency domain data including a repetition frequency parameter and a carrier envelope phase parameter in the optical comb carrier, which are buffered by the frequency domain data buffer unit. The selected-frequency processing unit is provided for detecting whether the repetition frequency parameter and the carrier envelope phase parameter in the current optical comb carrier are consistent with the repetition frequency value and the carrier envelope phase value in the mode-locked state. If inconsistent, a forward or reverse error between the repetition frequency parameter in the current optical comb carrier and the repetition frequency value in the mode-locked state, and a forward or reverse error between the carrier envelope phase parameter in the current optical comb carrier and the carrier envelope phase value in the mode-locked state are determined, so as to obtain the adjustment direction information. These information will be transmitted to the data buffer control module together with the power parameter of the pump source, the temperature parameter of the pump source and the working environment temperature parameter of the pump source, where a data transmission signal flow is as a flow ⑯⑰⑱④ shown in FIG. 2. And then the data are fed back to the lower computer control module and the upper computer control device. When the optical comb is out of the mode-locked state due to changes in the external environment, the data acquisition and processing module can quickly monitor the current mode-unlocking situation and the possible causes of the loss of locking, determine a debugging direction, and provide feedback, which can help the optical comb quickly restore to the mode-locked state.

The data buffer control module can be designed to be composed of an input FIFO interface, an input FIFO controller, a buffer controller, an external memory, an output FIFO controller, and an output FIFO interface, where a data transmission signal flow is as a flow ⑤⑥⑦⑧⑨⑩ shown in FIG. 2. When selecting a specific device, a bit width of an external memory can be 64 bit, a working frequency is 400 M, and the data are sampled on the upper edges or the lower edges of the clock. A working frequency of the data buffer control module can be about 500 M, and a sampling bit width is 12 bit. The data cache control module and the external memory are in different clock domains. As a result, the input and output FIFO controllers are adopted to complete a mission that the sampling data bit width, the read and write frequency are converted to the stored data bit width and the working frequency. Both the input and output FIFO controllers adopt asynchronous operation, where reading and writing are performed at the same time to ensure that the front-end data is successfully written into the external memory through the buffer controller. The performance of the data buffer control module reflects the data processing capability of the entire central control device, which is closely related to the spectrum resolution accuracy of the system. Since spectrum resolution=sampling rate/number of sampling points, when the sampling rate is high, the number of sampling points needs to be increased accordingly to maintain the spectrum resolution accuracy. When the sampling frequency is 500 M, if the spectral resolution is 1 K, then the number of sampling points is 500 M/1 K=500 K. The sampling bit width is 12~16 bit, and the corresponding storage system size should be 500 K×16×8 M. If the spectral resolution is 1 Hz, then the storage size should be 8 G. If the sampling frequency is increased to 1 G, then the buffer size corresponds to 16 G, so the performance of the data cache control module is one of the main parameters to measure the data processing capacity of the overall central control device.

A network control system can be established between the lower computer control module and the upper computer control device for data communication through a network communication method. The network control system can be designed to be composed of an Ethernet controller and an Ethernet physical layer, where a data transmission signal flow is as a flow ⑪⑫⑬ shown in FIG. 2, and the network control system is provided for connecting a control core of the upper computer with a control core of the lower computer. The transmission rate can be determined as needed, for example, it can be designed to be 1000 Mbps. A transmission layer of the network control system adopts the general user datagram protocol (UDP) to facilitate the connection and debugging of the upper computer control device. At the same time, the transmission layer of the network control system integrates functions such as ARP, which not only facilitates the acquisition of the client MAC address of the lower computer control module in the mode-locking control subsystem, but also lays the foundation for the upper computer control device to integrate and control multiple mode-locking control subsystems. The application layer has created its own protocol based on UDP, thereby forming a bridge connecting the upper computer control device and the mode-locking control subsystem. In addition, if the data processed by the data acquisition processing module and the data buffer control module in the mode-locking control subsystem needs to be displayed on a side of the upper computer control device, such as the power parameter of the pump source and pump source in the mode-locking control subsystem and the working environment temperature parameter the pump source, they can also be transmitted from the lower computer control module to the upper computer control device through the network control system. After the upper computer control device setting the mode-locked state parameter and updating the control parameter of the working condition in the mode-locked state, these parameters are all downloaded through the network control system to the lower computer control module of the mode-locking control subsystem, and stored by the lower computer controls the module into the parameter storage module for subsequent retrieval, where a data transmission signal flow of storing and retrieving is as a flow ⑭⑮ shown in FIG. 2.

The upper computer control module Converts commands into analog signals that can be recognized by the device through the DA group, to control the voltage-controlled constant current source and the environment temperature control device, thereby adjusting the environment temperature and the working power of the pump light, and finally acting on the optical comb carrier to realize the debugging of the mode-locked state. The lower computer control module can also control a start-stop function of the pump source temperature sensing device and the environment temperature sensing device through the DA group, where a data transmission signal flow is as a flow ⑲⑳㉑ shown in FIG. 2.

In the method and system for automatically controlling the mode-locking of the optical frequency comb of the present disclosure, through retrieving the stored control parameter of the working condition in the mode-locked state, combining with the working feedback parameters, the working power of the pump source or/and the temperature of the working environment of the pump source in the optical frequency comb system are dynamically adjusted. And the stored control parameter of the working condition in the mode-locked state is updated according to the control parameter of the actual working condition after the mode-locking. The above processes are important work contents to realize a stable control of the optical frequency comb, which are completed by the central control device of the mode-locking control subsystem in the system for automatically controlling the mode-locking of the optical frequency comb. It is necessary to adopt a reasonable control strategy to achieve the mode locking of optical frequency comb and a stable control in a better and faster way. The present disclosure will be illustrated by the following specific embodiments.

Embodiment 1

In the embodiment, the dynamic adjustment and control of the working power of the pump source needs to adopt a control strategy aiming at high efficiency and energy-saving. When the optical frequency comb is activated, the temperature of the pump source is low, and the temperature of the working environment of the pump source may be lower or higher than the temperature of the pump source in the stable working condition, which will affect the mode-locking control of the optical frequency comb, so the working power of the pump source needs to be adjusted to balance the working environment temperature.

In one of the available adjustment strategies of the working power of the pump source, the mode-locked state of the optical frequency comb is judged and controlled. When the optical frequency comb is out of the mode-locked state, the working power of the pump source is gradually increased until the optical comb is in the mode-locked state to maintain the working power of the pump source. After the pump source works stably, as the temperature rises and it drives the change of the working environment temperature, the previously maintained working power of the pump source may appear to be overpowered, so that the working power of the pump source needs to be lowered. The optical comb may be out of mode-locked state in a process of reducing the working power, so it is necessary to increase the working power of the pump source again until the power source is in the locked state again. Therefore, there may be multiple reciprocating oscillations of the working power of the pump source in a tracking adjustment control, to achieve a relatively stable mode-locking control, resulting in a long time for stable mode-locking, and the power reciprocating oscillation tracking control is easy to cause excess energy consumption.

Therefore, the embodiment provides a more preferred control strategy for adjusting the working power of the pump source, in which a preset control parameters of the working condition in the upper computer control module can be designed to include a power-temperature curve of mode-locked state in the starting working condition and setting information of the working power of the pump source corresponding to the mode-locked state in the stable working condition. The power-temperature curve under the mode-locked state in the starting working condition shows a relationship between a temperature of the pump source in the starting working condition and a working power of the pump source required for mode-locking. A process that the upper computer control module dynamically adjusts the working power of the pump source is designed to includes the following steps.

Upon starting, the upper computer control module searches a current working power of the pump source required for mode-locking corresponding to a current temperature of the pump source from the power-temperature curve under the mode-locked state in the starting working condition according to a current temperature parameter of the pump source. The mode-locked state of the optical comb is determined according to the current mode-locking frequency parameter. If the current feedback repetition frequency parameter and the current feedback carrier envelope phase parameter are consistent with the set repetition frequency value and the set carrier envelope phase value in the mode-locked state, that is, the optical comb has been mode-locked, then the working power value of the pump source is maintained. If there is a forward or reverse error between the current feedback repetition frequency parameter and the set repetition frequency in the set mode-locked state, or there is a forward or reverse error between the current feedback carrier envelope phase parameter and the set carrier envelope phase value of the set mode-locked state, that is, the optical comb has not been mode-locked, then the working power of the pump source is further adjusted until the optical comb is mode-locked. The working power value of the pump source is maintained, and the repetition frequency and the carrier envelope phase are locked, so that the optical frequency comb is maintained in the mode-locked state.

In the above-mentioned preferred control strategy for adjusting the working power of the pump source, when the optical frequency comb is activated, the temperature of the pump source is low, and the temperature of the working environment of the pump source may be lower or higher than the temperature of the pump source in the stable working condition. Therefore, according to the current temperature parameter of the pump source, the working power value of the pump source required for mode-locking corresponding to the current temperature of the pump source is searched from the power-temperature curve under the mode-locked state in the starting working condition, and the working power of the pump source is adjusted and set according to the current working power to quickly realize the mode-locking control. If the optical comb can be directly mode-locked, then the fast mode-locking control is directly realized. If the optical comb is not yet mode-locked, the power adjustment direction can be determined according to the working feedback parameters, and then the working power of the pump source can be further adjusted simply to realize the mode-locking of the comb, thereby greatly improving the efficiency of mode-locking control. When the timing that the optical comb maintains the mode-locked state after starting reaches a preset mode-locked state period, the working power of the pump source is adjusted and set according to the setting information of the working power of the pump source corresponding to the mode-locked state in the stable working condition, so that the optical frequency comb is maintained in the mode-locked state continuously. Therefore, the above-mentioned method for automatically controlling the mode-locking of the optical frequency comb not only greatly shortens the control time for stable mode-locking and realizes a fast mode-locking control, but also reduces unnecessary power consumption caused by unnecessary power reciprocating oscillation tracking control, thereby achieving an energy-saving effect in the power adjustment control process.

In the above-mentioned preferred adjustment control strategy of the working power of the pump source, the initial setting and stored parameter information, such as a power-temperature curve of mode-locked state in the starting working condition and mode-locking stability time, can be obtained through previous knowledge or experience, or through prior test statistics. After obtaining these parameters, the above-mentioned control strategy can be executed. When the central control device adjusts and controls the working power of the pump source during the starting working condition, if the working power of the pump source is further adjusted until the optical comb is mode-locked, the working power value of the pump source after the mode-locking and the current temperature of the pump source are fed back to the upper computer control device, and the upper computer control device updates the working power value of the pump source located at a point of the current temperature of the pump source in the power-temperature curve under the mode-locked state in the starting working condition stored in the central control device of the mode-locking control subsystem according to the working power value of the pump source. Therefore, the power-temperature curve under the mode-locked state in the starting working condition can be continuously updated during the mode-locking control and operation of the optical frequency comb, so that the power-temperature curve under the mode-locked state in the starting working condition is more consistent with the mode-locking operation of the optical comb system upon starting. Therefore, in the subsequent mode-locking control, when the power-temperature curve under the mode-locked state in the starting working condition is retrieved to adjust and control the working power of the pump source, which is more conducive to the fast mode-locking when the optical comb system is started.

Further, in the power control of the stable working condition of the above-mentioned preferred adjustment control strategy of the working power of the pump source, the setting information of the working power of the pump source corresponding to the mode-locked state in the stable working condition may be designed to include the power-temperature curve under the mode-locked state in the stable working condition, showing the relationship between the working environment temperature of the pump source that maintains the mode-locked state in the stable working condition and the working power of the pump source required for maintaining the set mode-locked state. A process that the central control device of the mode-locking control subsystem adjusts and sets the working power of the pump source according to the setting information of the working power of the pump source corresponding to the mode-locked state in the stable working condition is as follows. A working power value of the pump source required for mode-locking corresponding to a current temperature of the working environment of the pump source is searched in real time from the power-temperature curve under the mode-locked state in the stable working condition according to the current temperature parameter of the pump source. The working power of the pump source is adjusted and set according to the working power value, and the mode-locking frequency parameters is detected in real time to determine the mode-locked state of the optical comb. If the current feedback repetition frequency parameter and the current feedback carrier envelope phase parameter are consistent with the set repetition frequency value and the set carrier envelope phase value in the mode-locked state, that is, the optical comb is maintained in the mode-locked state, then the working power value of the pump source is maintained. If there is a forward or reverse error between the current feedback repetition frequency parameter and the set repetition frequency in the set mode-locked state, or there is a forward or reverse error between the current feedback carrier envelope phase parameter and the set carrier envelope phase value of the set mode-locked state, that is, the optical comb has not been mode-locked, then the working power of the pump source is further adjusted until the optical comb is mode-locked. The working power value of the pump source is maintained, and the repetition frequency and the carrier envelope phase are locked, so that the optical frequency comb is maintained in the mode-locked state.

Therefore, in the power control in the stable working condition, since the pump source has been working for a period of time, the temperature of the pump source tends to a stable state, and the fluctuation of the environment temperature becomes a main factor affecting the working state of the pump source. Therefore, according to the real-time collected working environment temperature parameter of the pump source, the working power value of the pump source corresponding to the current temperature of the working environment of the pump source can be searched from the power-temperature curve under the mode-locked state in the stable working condition, and the working power of the pump source is adjusted and set in real time. During the process, if the optical comb is maintained in the mode-locked state, then the working power of the pump source is continuously maintained. If the optical comb is out of the mode-locked state, then the power adjustment direction is determined according to the working feedback parameters, and the working power of the pump source is adjusted appropriately to restore the mode-locking of the optical comb, and the power is maintained to control the mode-locked state. Therefore, the power control in the stable operating conditions is quickly stabilized, which not only greatly shortens the control time for stable mode-locking and realizes a fast mode-locking control, but also reduces unnecessary power consumption caused by unnecessary power reciprocating oscillation tracking control, thereby ensuring the energy-saving effect of power adjustment control process.

In the above-mentioned preferred control strategy for adjusting the working power of the pump source, parameter information of the power-temperature curve under the mode-locked state in the stable working condition can be obtained through previous knowledge or experience, or a previous test statistics. After obtaining these parameter information, the above-mentioned preferred control strategy for adjusting the working power of the pump source can be executed. When the central control device adjusts and controls the working power of the pump source in the stable working condition, if the working power of the pump source is adjusted due to the loss of mode-locking of the optical comb until the optical comb is mode-locked again, the re-mode-locked pump power value and the current temperature of the working environment of the pump source can be fed back, and the upper computer control device updates the working power value of the pump source located at a point of the current temperature of the pump source in the power-temperature curve under the mode-locked state in the stable working condition stored in the central control device of the mode-locking control subsystem according to the working power value of the pump source. Therefore, the power-temperature curve under the mode-locked state in the stable working condition can be continuously updated during the mode-locking control and operation of the optical frequency comb, so that the power-temperature curve under the mode-locked state in the stable working condition is more consistent with the mode-locking operation of the optical comb system in the stable working condition. In the subsequent mode-locking control, when the power-temperature curve under the mode-locked state in the stable working condition is retrieved to adjust and control the working power of the pump source, the mode-locked state is maintained stably when the optical comb system is in the stable working condition, thereby guaranteeing a good measurement accuracy.

Embodiment 2

The embodiment provides a high-efficient and stable control strategy for dynamically adjusting and controlling the temperature of the working environment of the pump source. When the optical frequency comb is activated, the temperature of the pump source is low, and the temperature of the working environment of the pump source may be lower or higher than the temperature of the pump source in the stable working condition, which will affect the mode-locking control of the optical frequency comb. Therefore, except by adjusting the pump source to balance the working power, the stable control of the temperature of the working environment of the pump source is also an important factor to ensure the fast mode-locking and stable operation of the optical frequency comb.

In one of available adjustment strategies of the temperature of the working environment of the pump source, the temperature is controlled stably according to the temperature of the mode-locking environment. Since the optical comb system runs stably for a period of time, the environment temperature may increase due to the continuous operation of the equipment, so the environment temperature can be adjusted by an environment temperature control device to maintain in a stable temperature of the mode-locking environment. The environment temperature control method is relatively simple, but it actually has a certain control hysteresis for the stable operation of the optical comb system. Compared with the environment temperature, the working temperature of the pump source has a more direct impact on the stability of the optical comb system. After a period of operation, the working temperature of the pump source increases due to continuous work. If the environment temperature is significantly higher than the environment temperature required for mode-locking due to the increase in the working temperature of the pump source, it is indicated that the working temperature of the pump source has been higher than an expected temperature for a period of time. There will be a certain control hysteresis to balance the working temperature of the pump source by adjusting the ambient temperature at this time, which is not conducive to maintain a good and stable working condition of the optical comb system.

Therefore, the embodiment provides a more preferable implementation of the control strategy for adjusting the temperature of the working environment of the pump source. In the dynamic adjustment and control of the temperature of the working environment of the pump source, the control parameters of the working condition preset in the upper computer control module of the mode-locking control subsystem can be designed to include mode-locking reference environment temperature parameter and a reference pump source temperature parameter in stable working condition. The upper computer control module dynamically adjusts the temperature of the working environment of the pump source as follows.

Upon starting, the upper computer control module of the mode-locking control subsystem instructs the lower computer control module to control the environment temperature control device to adjust the temperature of the working environment of the pump source according to the mode-locking reference environment temperature parameter. When the temperature of the working environment of the pump source reaches the mode-locking reference environment temperature value, the temperature of the working environment of the pump source is continuously controlled according to the mode-locking reference environment temperature parameters, and whether a difference between a collected temperature of the pump source and the reference pump source temperature parameter in the stable working condition exceeds a preset warning range of a self-adjusting temperature of the pump source is determined in real time. When the difference exceeds the preset warning range, the temperature of the working environment of the pump source is adjusted, so that the difference is restored to the preset warning range of the self-adjusting temperature of the pump source.

In the above-mentioned preferred adjustment control strategy of the temperature of the working environment of the pump source, when the optical frequency comb is activated, the temperature of the pump source is relatively low, and the temperature of the working environment of the pump source may be lower or higher than the stable working temperature, so the temperature of the working environment of the pump source is adjusted according to the mode-locking reference environment temperature parameter, so that the environment temperature can quickly reach the reference environment temperature required for mode-locking, thereby creating a good temperature condition for mode-locking of the optical comb system. After the temperature of the working environment of the pump source reaches the mode-locking reference environment temperature value, the temperature of the working environment of the pump source is continuously controlled according to the mode-locking reference environment temperature parameter, so the working temperature of the pump source itself gradually increases. In order to improve the timeliness of the stable operation control of the optical comb system, the temperature of the working environment of the pump source needs to be continuously controlled according to the mode-locking reference environment temperature parameter, and whether a difference between a collected temperature of the pump source and the reference pump source temperature parameter in the stable working condition exceeds a preset warning range of the self-adjusting temperature of the pump source is determined in real time. When the difference exceeds the preset warning range, the temperature of the working environment of the pump source is adjusted, so that the difference is restored to the preset warning range of the self-adjusting temperature of the pump source. On this basis, the temperature of the working environment of the pump source is continued to controlled according to the mode-locking reference environment temperature parameter.

Specifically, a value of the preset warning range of the self-adjusting temperature of the pump source needs to be determined according to the self-adjustment temperature range of the pump source. The self-adjustment temperature range of the pump source refers to a temperature range within which the working temperature of the pump source can be effectively adjusted by adjusting and controlling the working power of the pump source, and the value interval of the self-adjustment temperature range can be determined by prior experiments. A lower limit of the value interval of the preset warning range of the self-adjusting temperature should be greater than a lower limit of the self-adjustment temperature range of the pump source, and an upper limit of the value interval of the preset warning range of the self-adjusting temperature should be smaller than a lower limit of the self-adjustment temperature range of the pump source, that is, the preset warning range of the self-adjusting temperature of the pump source is a proper subset that does not include the upper and lower limits of the self-adjusting temperature of the pump source.

When it is determined that the difference between the pump source temperature and the reference pump source temperature parameter in the stable working condition exceeds the preset warning range of the self-adjusting temperature of the pump source, the pump source temperature of the pump source at this time should be maintained within the self-adjustment temperature range, and the pump source's own working temperature is immediately adjusted by controlling the environment temperature, to achieve purposes of adjusting the working temperature of the pump source in time, reducing the hysteresis of the temperature control adjustment, and improve the stable control efficiency, which is conducive to maintain the stable working condition of the optical comb system.

When the central control device of the system for automatically controlling the mode-locking of the optical frequency comb of the present disclosure specifically works in the working mode of the temperature adjustment control of the working environment of the pump source, it can be implemented through the following command control scheme.

In a specific implementation, at a temperature parameter collection end, the temperature parameter of the pump source and the working environment temperature parameter of the pump source can be collected by using negative temperature coefficient (NTC) thermistors respectively. The NTC thermistors generate the corresponding analog voltages according to the current temperature change in real time, and feed it back to the analog-to-digital converters of the AD group. The analog-to-digital converters generates the digital voltages corresponding to the analog voltages, where the accuracy is proportional to the AD conversion digits. The field programmable gate array (FPGA) control board of the lower computer control module can read the digital voltage value in real time through the serial peripheral interface (SPI) serial protocol, so the current temperature parameter is determined in real time according to a corresponding relationship between the voltage and the temperature.

Figure 3:
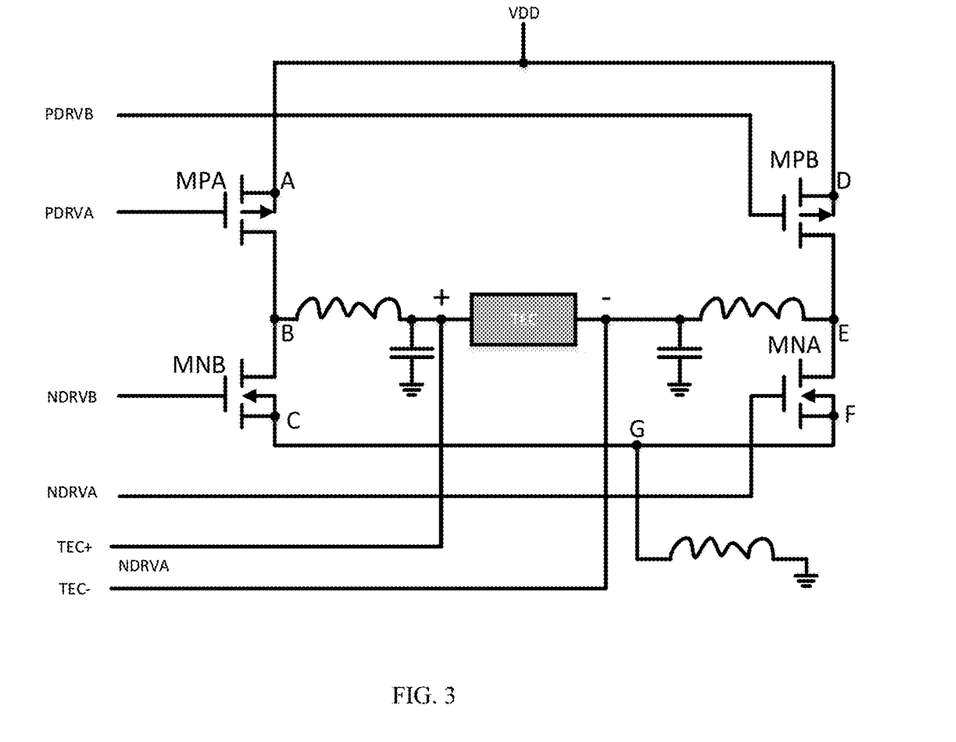
FIG. 3 is a schematic diagram of a semiconductor refrigerator control circuit adjusted by an H-bridge circuit according to an embodiment of the present disclosure.

In specific implementation, at the environment temperature control end, the environment temperature control device can adopt a commonly used semiconductor refrigerator regulated by the H-bridge circuit to perform cooling and heating bidirectional temperature control. The control circuit of the semiconductor refrigerator regulated by the H-bridge circuit is as shown in FIG. 3. In the control process, the upper computer control module issues a temperature control command to act on the semiconductor refrigerator adjusted by the H-bridge circuit to adjust the environment temperature.

As shown in FIG. 3, the control circuit of the semiconductor refrigerator adjusted by the H-bridge circuit includes a semiconductor refrigerator (TEC), and a first bridge branch and a second bridge branch connected in parallel at both ends of the semiconductor refrigerator (TEC). A first P-channel Metal Oxide Semiconductor (PMOS) tube (MPA) and a second PMOS tube (MPB) are connected in series in the bridge branch. A source of the first PMOS tube (MPA) is connected to a source of the second PMOS tube (MPB), and they both are connected to a power supply terminal (VDD). A drain of the first PMOS tube (MPA) is connected in parallel to a positive terminal (TEC+) of the semiconductor refrigerator (e.g., thermoelectric cooler (TEC)), and a drain of the second PMOS tube (MPB) is connected in parallel to a negative terminal (TEC−) of the semiconductor refrigerator (TEC). The first N-channel Metal Oxide Semiconductor (NMOS) tube (MNA) and the second PMOS tube (MNB) are connected in series in the second bridge branch. A source of the first NMOS tube (MNA) and a source of the second NMOS tube (MNB) are connected and then connected to a ground terminal. A drain of the first NMOS tube (MNA) is connected in parallel to the negative terminal (TEC−) of the semiconductor refrigerator (TEC). A drain of the second NMOS tube (MNB) is connected in parallel to a positive terminal (TEC+) of the semiconductor refrigerator (TEC). the gates of the first PMOS tube (MPA), the second PMOS tube (MPB), the first NMOS tube (MNA) and the second PMOS tube (MNB) are respectively connected to a first voltage control terminal (PORVA), a second voltage control terminal (PORVB), a third voltage control terminal (NORVA) and a fourth voltage control terminal (NORVB).

Figure 4:
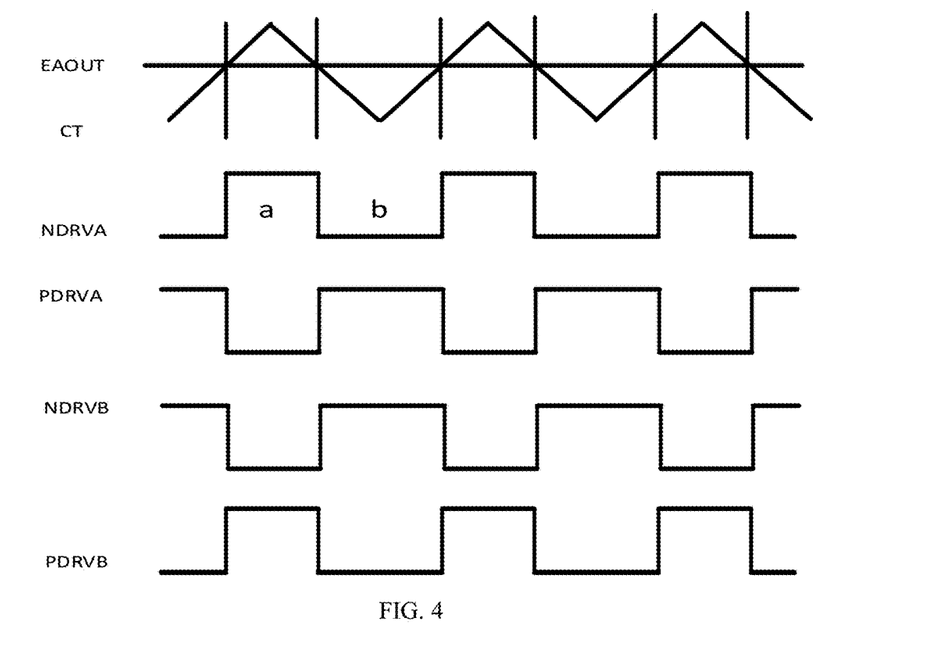
FIG. 4 is a diagram showing MOS control wave forms of the semiconductor refrigerator control circuit adjusted by the H-bridge circuit according to an embodiment of the present disclosure.

In the semiconductor refrigerator control circuit regulated by the H-bridge circuit, voltage drain drain (VDD) is a power supply terminal, where a point G is grounded. TEC+/TEC− are respectively connected to the two ends of the semiconductor refrigerator. When a current direction is from TEC+ to TEC−, the refrigerator is cooling; when the current direction is from TEC− to TEC+, the refrigerator is heating. The H-bridge circuit is composed of two groups of MOS tubes, where the MPA (PMOS) and the MNA (NMOS) form one group, and the MPB (PMOS) and the MNB (NMOS) form the other group. For the PMOS tube, when the gate-source voltage difference is less than 0, the PMOS tube is turned on. On the contrary, for the NMOS tube, when the gate-source voltage difference is greater than 0, the NMOS tube is turned on. The examples of two groups of MOS control waveform are shown in FIG. 4. When NDRVA is at high voltage and PDRVA is at low voltage, or the NDRVB is at low voltage and the PDRVB is at high voltage, the MPA and the MNA are turned on; the MPB and the MNB are turned off, so a current flow in a direction of A, B, TEC+, TEC−, E, F, G is formed, and the TEC performs cooling. On the contrary, when the MPA and the MNA are turned off, and the MPB and the MNB are turned on, the current flow in a direction of D, E, TEC−, TEC+, B, C, G is formed, and the TEC performs heating. The CT is a triangular wave with the reference voltage is a center, and the EAOUT is the error voltage, that is, a difference between the thermistor test voltage and the upper computer setting voltage. In this way, the voltages of the first voltage control terminal (PORVA), the second voltage control terminal (PORVB), the third voltage control terminal (NORVA), and the fourth voltage control terminal (NORVB) are separately controlled, thereby controlling the cooling and heating of the semiconductor refrigerator (TEC).

When the upper computer control module controls the TEC cooling, the upper computer control module sets the voltage value to increase, the EAOUT output is less than the reference voltage, and the width of the triangle wave at the upper part of EAOUT is greater than the width at the lower part of EAOUT, corresponding to the duty cycle of the square wave below a>b, That is, the cooling time is long and the heating time is short, so as to realize the control of temperature drop, and the greater the difference between the upper computer control module voltage setting and the thermistor voltage, the greater the duty cycle difference, and the higher the cooling efficiency. As the ambient temperature decreases, the difference between the thermistor voltage and the set voltage decreases, and the duty ratios of a and b gradually become equal and constant, and a temperature cooling adjustment is completed.

When the upper computer control module controls the cooling of the TEC, the setting voltage value of the upper computer control module increases; the EAOUT output is less than the reference voltage; the width of the triangle wave at the upper part of EAOUT is greater than the width at the lower part of EAOUT, corresponding to the duty cycle of the lower square wave a>b, that is, a cooling time is long and the a heating time is short, thereby controlling the temperature drop. In addition, the greater the difference between the setting voltage of the upper computer control module and the thermistor voltage, the greater the difference in duty cycle and the higher the cooling efficiency. As the environment temperature decreases, the difference between the thermistor voltage and the setting voltage decreases, and the duty ratios of a and b gradually become equal and constant, thereby completing a temperature heating adjustment.

Through the above-mentioned method, the central control device can adjust the control strategy according to the temperature of the working environment of the pump source, and assist the stable working of the optical comb system.

Embodiment 3

In this embodiment, both the dynamic adjustment control of the pump source working power adopted in Embodiment 1 and the dynamic adjustment control of the temperature of the working environment of the pump source adopted in Embodiment 2 are adopted in the system for automatically controlling the mode-locking of the optical frequency comb. Although the dynamic adjustment and control processes of the two adjustment controls operate separately, the two processes provide cooperative and combined assistance for the stable operation of the optical frequency comb.

When the optical frequency comb is activated, the temperature of the pump source is low, and the temperature of the working environment of the pump source may be lower or higher than the temperature in the stable working condition. At this time, the temperature of the working environment of the pump source is dynamically adjusted and controlled to make the environment temperature rapidly reaching the reference environment temperature required for mode-locking, creating a good temperature condition for the optical comb system for the mode-locked state, and the dynamic adjustment and control of the working power of the pump source can achieve fast mode-locking. After a period of working time, the optical comb system enters the stable working condition, the working power of the pump source can be dynamically adjusted and controlled to maintain the working power of the pump source in the stable working condition. The working temperature is controlled, and the temperature of the working environment of the pump source is dynamically adjusted and controlled, thereby adjusting the working temperature of the pump source, and improving the efficiency of stable control, which is beneficial for the optical comb system to maintain the stable working condition.

In addition, in the system for automatically the mode-locking of the optical frequency comb of the present disclosure, an upper computer control device is allowed to communicate with multiple mode-locking control subsystems. According to its own working condition, each mode-locking control subsystem can respectively implement the automatic mode-locking control for the optical frequency comb by using the control methods of Embodiment 1 and Embodiment 2, where their respective updated mode-locked state control parameters are sent to the upper computer control device. Thus, the upper computer control device can timely update the control parameters of the mode-locked state of all mode-locking control subsystems based on the feedback of each mode-locking control subsystem, so that the control parameters of the mode-locked state can be more consistent with the mode-locked state in an actual working condition of the optical comb system, and the mode locking optimization control of the big data update method is realized, which id more conducive to the fast mode-locking and maintenance of the mode-locked state of the optical comb system, thereby effectively improving the mode-locking control process of the optical frequency comb system, and ensuring its working stability and measurement accuracy.

It should be noted that, the above embodiments are only intended to illustrate the technical solutions of the present disclosure, but not to limit the present disclosure. Although the present disclosure has been described with reference to the preferred embodiments, those of ordinary skill in the art can make various changes in form and details without departing from the spirit and scope of the present disclosure as defined by the appended claims.

What is claimed is:

1. A method for automatically controlling mode-locking of an optical frequency comb, comprising:

collecting working feedback parameters of an optical frequency comb system; wherein the working feedback parameters comprises mode-locking frequency parameters, a power parameter of a pump source, a temperature parameter of the pump source, and a working environment temperature parameter of the pump source; the mode-locking frequency parameters comprises a repetition frequency parameter of an optical comb carrier and an envelope phase parameter of the optical comb carrier; and retrieving a stored control parameter of a working condition in mode-locked state, and combining with the working feedback parameters, to dynamically adjust a working power of the pump source or/and a temperature of the working environment of the pump source in the optical frequency comb system, thereby completing the mode-locking of the optical frequency comb; and according to a control parameter of an actual working condition after the mode-locking, updating the stored control parameter of the working condition in the mode-locked state for subsequent retrieval;

wherein the stored control parameter of the working condition in the mode-locked state comprises a power-temperature curve under mode-locked state in a starting working condition and setting information of the working power of the pump source corresponding to mode-locked state in a stable working condition; the power-temperature curve shows a relationship between a temperature of the pump source in the starting working condition and a working power of the pump source required for mode-locking;

a process of dynamically adjusting the working power of the pump source comprises:

upon starting, according to a current temperature parameter of the pump source, searching a working power value of the pump source required for mode-locking corresponding to the current temperature of the pump source from the power-temperature curve under the mode-locked state in the starting working condition; adjusting and setting the working power of the pump source according to the working power value;

determining the mode-locked state of an optical comb according to a current mode-locking frequency parameter; if the optical comb is mode-locked, maintaining the working power value of the pump source; if the optical comb is not in the mode-locked state, further adjusting the working power of the pump source until the optical comb is in the mode-locked state, and maintaining the working power value of the pump source, so that the optical frequency comb is maintained in the mode-locked state;

when mode-locking time of the optical comb after starting reaches a preset starting stabilization duration, adjusting and setting the working power of the pump source according to the setting information of the working power of the pump source corresponding to the mode-locked state in the stable working condition, so that the optical frequency comb is maintained in the mode-locked state.

2. The method of claim 1, wherein a process of updating the stored control parameter of the working condition in the mode-locked state comprises:

after further adjusting the working power of the pump source until the optical comb is in the mode-locked state, feeding back the working power value of the pump source in the mode-locked state and the current temperature of the pump source; and updating a working power value of the pump source located at a point of the current temperature of the pump source in the power-temperature curve under the mode-locked state in the starting working condition according to the working power value of the pump source.

3. The method of claim 1, wherein the setting information of the working power of the pump source corresponding to the mode-locked state in the stable working condition comprises a power-temperature curve under the mode-locked state in the stable working condition, showing a relationship between the temperature of the pump source and the working power of the pump source required for mode-locking in the stable working condition;

a process of adjusting and setting the working power of the pump source according to the setting information of the working power of the pump source in the stable working condition comprises:

searching a working power value of the pump source required for mode-locking corresponding to a current temperature of the working environment of the pump source in real time from the power-temperature curve under the mode-locked state in the stable working condition according to the current temperature parameter of the pump source; adjusting and setting the pump source according to the working power value;

determining the mode-locked state of the optical comb by detecting a current mode-locking frequency parameter in real time; if the optical comb is mode-locked, maintaining the working power value of the pump source; if the optical comb is out of the mode-locked state, adjusting the working power of the pump source until the optical comb is in the mode-locked state, and maintaining the working power value of the pump source, so that the optical frequency comb is maintained in the mode-locked state.

4. The method of claim 3, wherein a process of updating the stored control parameter of the working condition in the mode-locked state comprises:

after adjusting the working power of the pump source due to a mode-unlocking of the optical comb until the optical comb is mode-locked, feeding back the working power value of the pump source and the current temperature of the pump source after the optical comb is re-mode-locked; and updating a working power value of the pump source located at a point of the current temperature of the pump source in the power-temperature curve under the mode-locked state in the starting working condition according to the working power value of the pump source.

5. A method for automatically controlling mode-locking of an optical frequency comb, comprising:

collecting working feedback parameters of an optical frequency comb system; wherein the working feedback parameters comprises mode-locking frequency parameters, a power parameter of a pump source, a temperature parameter of the pump source, and a working environment temperature parameter of the pump source; the mode-locking frequency parameters comprises a repetition frequency parameter of an optical comb carrier and an envelope phase parameter of the optical comb carrier; and retrieving a stored control parameter of a working condition in mode-locked state, and combining with the working feedback parameters, to dynamically adjust a working power of the pump source or/and a temperature of the working environment of the pump source in the optical frequency comb system, thereby completing the mode-locking of the optical frequency comb; and according to a control parameter of an actual working condition after the mode-locking, updating the stored control parameter of the working condition in the mode-locked state for subsequent retrieval;

wherein the control parameter of the working condition comprises a mode-locking reference environment temperature parameter and a reference pump source temperature parameter in a stable working condition;

a process of dynamically adjusting the temperature of the working environment of the pump source comprises:

upon starting, adjusting the temperature of the working environment of the pump source according to the mode-locking reference environment temperature parameter; after the temperature of the working environment of the pump source reaches the mode-locking reference environment temperature, continuously controlling the temperature of the working environment of the pump source according to the mode-locking reference environment temperature parameter; determining in real time whether a difference between a collected temperature of the pump source and the reference pump source temperature parameter in the stable working condition exceeds a preset warning range of a self-adjusting temperature of the pump source; and adjusting the temperature of the working environment of the pump source when the difference exceeds the preset warning range, to restore the difference to the preset warning range.

\* \* \* \* \*